United States Patent
Mukundala

(10) Patent No.: US 11,151,240 B2
(45) Date of Patent: Oct. 19, 2021

(54) ACCESS KEY CARD THAT CANCELS AUTOMATICALLY FOR SAFETY AND SECURITY

(71) Applicant: Carrier Corporation, Palm Beach Gardens, FL (US)

(72) Inventor: Sumanth Kumar Mukundala, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 195 days.

(21) Appl. No.: 16/184,084

(22) Filed: Nov. 8, 2018

(65) Prior Publication Data

US 2019/0180021 A1    Jun. 13, 2019

(30) Foreign Application Priority Data

Dec. 11, 2017   (IN) .............................. 201711044467

(51) Int. Cl.
| | |
|---|---|
| *G06F 21/44* | (2013.01) |
| *G06F 21/45* | (2013.01) |
| *G07C 9/00* | (2020.01) |
| *G07C 9/27* | (2020.01) |
| *G07C 9/21* | (2020.01) |

(52) U.S. Cl.
CPC .............. *G06F 21/44* (2013.01); *G06F 21/45* (2013.01); *G07C 9/00309* (2013.01); *G07C 9/00904* (2013.01); *G07C 9/27* (2020.01); *G07C 9/00571* (2013.01); *G07C 9/00722* (2013.01); *G07C 9/21* (2020.01); *G07C 2009/00793* (2013.01)

(58) Field of Classification Search
CPC ........... G06F 21/44; G06F 21/45; G07C 9/27; G07C 9/00904; G07C 9/00309; G07C 9/21; G07C 9/00722; G07C 9/00571; G07C 2009/00793; G07C 9/00
See application file for complete search history.

(56) References Cited

U.S. PATENT DOCUMENTS

| | | | |
|---|---|---|---|
| 5,625,349 A | 4/1997 | Disbrow et al. | |
| 6,560,747 B1 * | 5/2003 | Weng ................ | G11B 20/1816 714/704 |
| 7,376,839 B2 | 5/2008 | Carta et al. | |

(Continued)

FOREIGN PATENT DOCUMENTS

WO         9740475 A1     10/1997

OTHER PUBLICATIONS

Cobra Controls ACP Door Access Control Systems; http://www.cobracontrols.com/technical?SID=227e80993084f46ca58e7c5e57af37d9; Nov. 7, 2018; 5 pages.

(Continued)

*Primary Examiner* — Quazi Farooqui
(74) *Attorney, Agent, or Firm* — Cantor Colburn LLP

(57) ABSTRACT

A method of monitoring access requests to one or more access controls of an access control system is provided. The method comprising: receiving a first access request from a key card to a first access control, the key card being encoded with a credential and an access code; determining that the credential is not authorized to access the first access control; checking a first value of the access code; and rewriting the first value of the access code to a second value of the access code if the first value of the access code does not equal a desired value of failed access request attempts.

19 Claims, 3 Drawing Sheets

(56) References Cited

U.S. PATENT DOCUMENTS

| | | |
|---|---|---|
| 7,600,679 B2 | 10/2009 | Kshirsagar et al. |
| 8,274,365 B2 | 9/2012 | Piccirillo et al. |
| 9,077,934 B2 | 7/2015 | Craner |
| 9,509,719 B2 | 11/2016 | Neely |
| 9,589,400 B2 | 3/2017 | Radicella et al. |
| 9,607,458 B1 | 3/2017 | Schleiff |
| 9,619,952 B1 | 4/2017 | Zhao et al. |
| 9,767,513 B1 | 9/2017 | Taylor et al. |
| 2009/0051486 A1 | 2/2009 | Denison et al. |
| 2010/0030590 A1* | 2/2010 | Sodaro .............. G06Q 50/163 705/5 |
| 2013/0292467 A1 | 11/2013 | Avs et al. |
| 2015/0213663 A1* | 7/2015 | Dumas .............. E05B 47/00 340/5.31 |
| 2016/0156619 A1* | 6/2016 | Lovelock .............. H04L 63/10 726/7 |
| 2016/0267738 A1* | 9/2016 | Carstens .............. E05C 9/18 |
| 2018/0262891 A1* | 9/2018 | Wu .............. G07C 9/00857 |
| 2018/0374293 A1* | 12/2018 | Zhang .............. G07C 9/00 |

OTHER PUBLICATIONS

How to Prevent Employees from Sharing Access Cards; https://www.idsuperstore.com/learning-center/how-to-prevent-employees-from-sharing-access-cards/; Nov. 7, 2018; 2 pages.

Visionline by VingCard; http://www.spica.rs/dms/RS/brosure/VISIONLINE-brosura/VISIONLINE%20brošura.pdf; Oct. 2014; 8 pages.

Zhang Zhouxiang; Time to Prevent Misuse of Lost or Stolen ID Cards; http://www.chinadaily.com.cn/opinion/2015-04/25/content_20538069.htm; Apr. 25, 2015; 3 pages.

The Extended European Search Report for Application No. 18210793.8-1009; Report dated May 9, 2019; 10 pages.

* cited by examiner

ACCESS KEY CARD THAT CANCELS AUTOMATICALLY FOR SAFETY AND SECURITY

CROSS-REFERENCE TO RELATED APPLICATIONS

This application claims the benefit of Provisional Indian Application No. 201711044467 filed Dec. 11, 2017, which is incorporated herein by reference in its entirety.

BACKGROUND

The subject matter disclosed herein generally relates to the field of access control systems, and more particularly to an apparatus and method for monitoring access control systems.

Existing access controls may allow a person to unlock hotel rooms via a key card. If the key card is lost or misplaced it is often difficult to disable the key card until the owner of the key card reports the lost or misplaced key card.

BRIEF SUMMARY

According to one embodiment, a method of monitoring access requests to one or more access controls of an access control system is provided. The method comprising: receiving a first access request from a key card to a first access control, the key card being encoded with a credential and an access code; determining that the credential is not authorized to access the first access control; checking a first value of the access code; and rewriting the first value of the access code to a second value of the access code if the first value of the access code does not equal a desired value of failed access request attempts.

In addition to one or more of the features described above, or as an alternative, further embodiments may include: disabling the credential when the access code reaches the desired value of failed access request attempts.

In addition to one or more of the features described above, or as an alternative, further embodiments may include that the first value of the access code is only re-written to the second value of the access code if the credential was not denied on the access control prior to the first access request.

In addition to one or more of the features described above, or as an alternative, further embodiments may include: transmitting a notification to a mobile device associated with the key card when the credential is disabled.

In addition to one or more of the features described above, or as an alternative, further embodiments may include: transmitting a notification to a server when the credential is disabled.

In addition to one or more of the features described above, or as an alternative, further embodiments may include: the desired value is equal to three failed access request attempts.

In addition to one or more of the features described above, or as an alternative, further embodiments may include: checking the second value of the access code; determining that the second value of the access code equals the desired value of failed access request attempts; and disabling the credential when the second value of the access code is equal to the desired value of failed access request attempts.

In addition to one or more of the features described above, or as an alternative, further embodiments may include: denying the key card access to the first access control.

In addition to one or more of the features described above, or as an alternative, further embodiments may include: receiving a second access request from the key card to a second access control; determining that the credential is not authorized to access the second access control; checking the second value of the access code; and rewriting the second value of the access code to a third value of the access code if the second value of the access code does not equal the desired value of failed access request attempts.

In addition to one or more of the features described above, or as an alternative, further embodiments may include: receiving a third access request from the key card to a third access control; determining that the credential is not authorized to access the third access control; checking the third value of the access code; rewriting the third value of the access code to a fourth value of the access code if the third value of the access code does not equal the desired value of failed access request attempts; checking the fourth value of the access code; determining that the fourth value of the access code equals the desired value of failed access request attempts; and disabling the credential when the fourth value of the access code is equal to the desired value of failed access request attempts.

In addition to one or more of the features described above, or as an alternative, further embodiments may include: receiving a fourth access request from the key card to a fourth access control; determining that the credential is not authorized to access the fourth access control; and denying the key card access to the fourth access control.

In addition to one or more of the features described above, or as an alternative, further embodiments may include: disabling the credential when the access code reaches the desired value of failed access request attempts in response to a policy stored in an access control.

According to another embodiment, an access control configured to control access to a room is provided. The access control comprising: a processor; and a memory comprising computer-executable instructions that, when executed by the processor, cause the processor to perform operations, the operations comprising: receiving a first access request from a key card to a first access control, the key card being encoded with a credential and an access code; determining that the credential is not authorized to access the first access control; checking the first value of the access code; and rewriting the first value of the access code to a second value of the access code if the first value of the access code does not equal a desired value of failed access request attempts.

In addition to one or more of the features described above, or as an alternative, further embodiments may include that the operations further comprise: disabling the credential when the access code reaches the desired value of failed access request attempts.

In addition to one or more of the features described above, or as an alternative, further embodiments may include that the access code is only increased if the credential was not denied on the access control prior to the first access request.

In addition to one or more of the features described above, or as an alternative, further embodiments may include that the operations further comprise: transmitting a notification to a mobile device associated with the key card when the credential is disabled.

In addition to one or more of the features described above, or as an alternative, further embodiments may include that the operations further comprise: transmitting a notification to a server when the credential is disabled.

In addition to one or more of the features described above, or as an alternative, further embodiments may include that the desired value is equal to three failed access request attempts.

In addition to one or more of the features described above, or as an alternative, further embodiments may include that the operations further comprise: checking the second value of the access code; determining that the second value of the access code equals the desired value of failed access request attempts; and disabling the credential when the second value of access code is equal to the desired value of failed access request attempts.

In addition to one or more of the features described above, or as an alternative, further embodiments may include that the operations further comprise: denying the key card access to the first access control.

Technical effects of embodiments of the present disclosure include tracking access requests to one or more access controls configured to open a door and canceling a key card after it has requested access to a selected number of different access controls.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
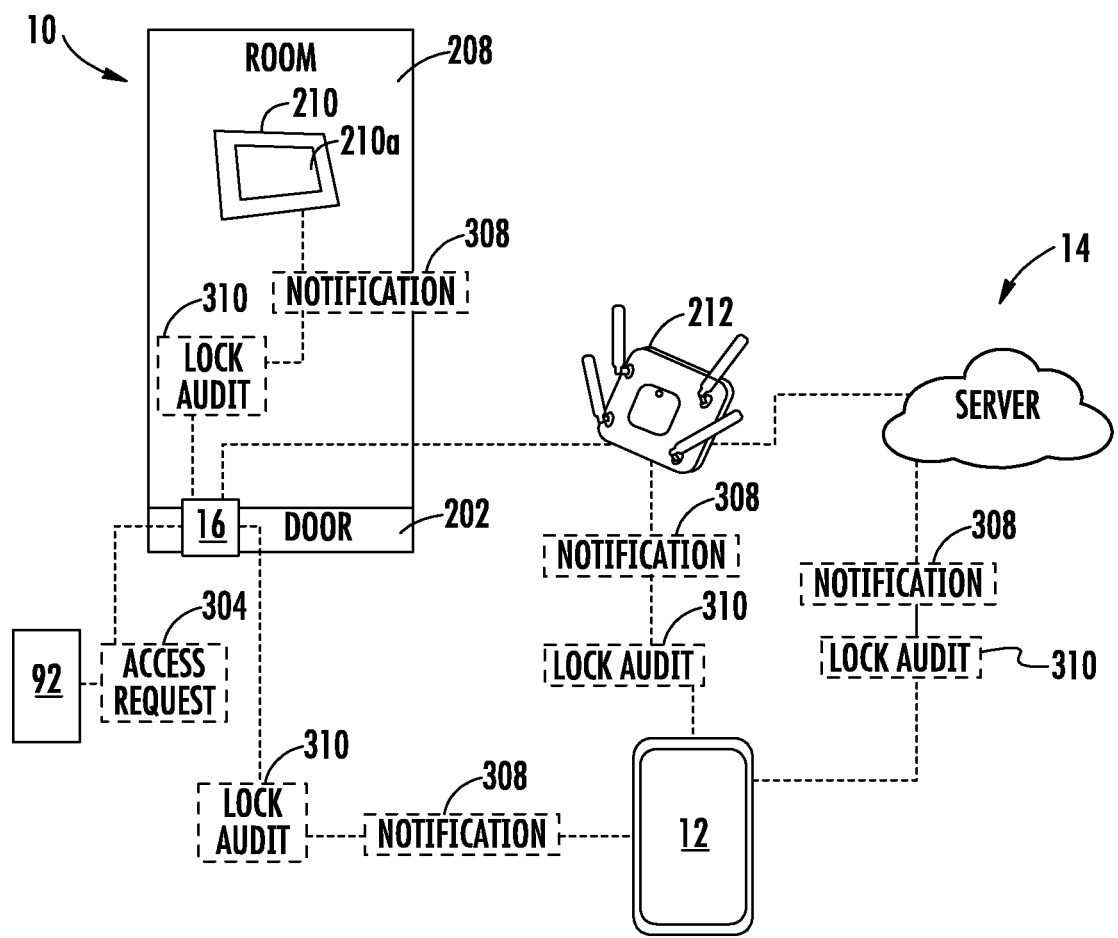
FIG. 1 illustrates a general schematic system diagram of an access control system, in accordance with an embodiment of the disclosure.

FIG. 1 schematically illustrates an access control system 10. The system 10 generally includes a key card 92, a server 14, a wireless access protocol device 212, a room management system 210, and an access control 16. The access control system 10 may be in wireless communication with a mobile device 12, as further described below. It should be appreciated that while one access control 16 is illustrated, the access control system 10 may include any number of access controls 16. It should be appreciated that, although particular systems are separately defined in the schematic block diagrams, each or any of the systems may be otherwise combined or separated via hardware and/or software. In another embodiment, the access controls 16 may control access through a door 202 to a room 208. It should be appreciated that while one door 202 and room 208 are illustrated, the access control system 10 may include any number of doors 202 and rooms 208. Further, there may be multiple doors 202 and access controls 16 for each room 208. A room management system 210 may be located in each room 208. The room management system 210 is configured to control operations of a room 208 including but not limited temperature and lighting.

For a selected period of time (e.g. period of stay for a person at a hotel) a person (e.g. hotel guest) may be given a key card 92 and the key card 92 may be granted access to one or more access controls 16 (e.g. the door lock on a hotel room assigned to the person). The key card 92 may be encoded with data or a credential that will allow the key card 92 to open an access control 16 operably connected to their assigned room. For example, when a person checks in to a hotel they will be given a key card 92 encoded with credentials to allow them to access an access control 16 operably connected to their assigned room(s) 208. A person may utilize their key card 92 to unlock and/or lock the access control 16 operably connected to their assigned room 208 through an access request 304. The key card 92 may store credentials to unlock and/or lock the access control 16. Some credentials may be used for multiple access controls 16 if there are multiple access controls 16 for a single assigned room 208 or the person is assigned access to multiple rooms 208. For example, an access control 16 operably connected to a person's hotel room and an access control 16 operably connected to a hotel pool may respond to the same credential. Other credentials may be specific to a single access control 16.

The key card 92 may be a physical key card 92. The key card 92 may be of a magnetic strip type, a RFID (radio frequency identification) type, or other type of physical access card as is well understood in the art of access control systems. The key card 92 may transmit an access request 304 to the access control 16 by, for example, when the key card 92 is inserted into the access control 16 for the access control 16 to read the key card 92 (e.g. a magnetic strip on an encoded key card 92). The key card 92 is capable of being encoded with card data via a writable feature such as, for example, a magnetic strip. The data may include credentials to grant access to a specific access control 16 and an access code to maintain a count, discussed further below. For example, for a period of stay for the key card 92 may be granted access to a specific access control 16.

The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the server 14 receives credentials and other data. The mobile device 12 is a wireless capable handheld device such as a smartphone that is operable to communicate with the server 14 and the access controls 16.

Each access control 16 may be a wireless-capable, restricted-access, or restricted-use device such as wireless locks, access control readers for building entry, and other restricted-use machines. The key card 92 submits credentials to the access controls 16, thereby selectively permitting a user to access or activate functions of the access controls 16. A user may, for example, submit a credential to an electromechanical lock to unlock it, and thereby gain access to a room 208.

The access control 16 may be configured to receive the access requests 304, save each access request 304, compile the access requests 304 into a lock audit 310, and then transmit the lock audit 310 to a mobile device 12 currently assigned to the room 208 operably connected to the access control 16. When the lock audit 310 is received on the mobile device 12, a person will then be able to view the lock audit 310 on the mobile device 12 through a mobile device application 80 (see FIG. 2). The lock audit 310 may contain access requests 304 from multiple different key cards 92 from various different people such as, for example, cleaning crews, hotel management, and technicians. The lock audit 310 may depict access requests 304 transmitted to the access control 16 assigned to their room 208 and/or the lock audit 310 may depict access requests 304 made by their key card 92 on any access control 16. The access control 16 may be configured to filter the lock audit 310 to include only access requests 304 received during a period of stay. Thus, a person will not be able to view access requests 304 that are received by the access control 16 operably connected to their assigned room 208 before or after the period of stay. If the mobile device 12 retrieves the lock audits 310 directly (e.g. by direct BTLE communication or via the wireless access protocol device 212 to the access control 16) from the access control 16 then the access control 16 may be filtering the lock audit 310. If the mobile device 12 retrieves the lock audits 310 from the server 14 and downloads the lock audits 310 or has them sent to the mobile device 12 in real time, then the server 14 may be filtering the lock audit 310. The lock audit 310 may be transmitted periodically at a selected interval or may be transmitted in response to a key card 92 being locked out, a process described below.

In an embodiment, each time a key card 92 is read by an access control 16 that the credential has not been granted access to (i.e. credential denied), the key card 92 is encoded by the access control 16 with a new value of the access code that rewrites a count that was read from the key card 92. The count is the number of times that the credential of the key card 92 has been denied (i.e. credential denial count). The count may change from a first value to a second value, then from the second value to the third value, then from the third value to a fourth value and so on and so forth with each failed access request 304. In an example, the count may be kept numerically and increased/rewritten by a single increment for each failed access request 304. For example, the first value of the access code may start out as "0" when the key card 92 is first encoded for a guest on check-in to a hotel and then change to a second value equal to "1" with the first failed access request 304, then change to a third value equal to "2" with the second failed access request 304, and so on and so forth until a desired value of failed access request attempts is reached. It is understood that the count may be kept using other methods including but not limited to alphabetically (e.g. first value=A, second value=B, third value=C . . . etc.) or numerically decreasing (e.g. first value=4, second value=3, third value=2 . . . etc.). The incremental increase between the each value of the access code may be equal to "1" or any other increment depending upon how the count of the access code is being kept.

In an embodiment, the count of the access code will only rewritten with multiple failed attempts on different access controls 16 rather than the same access control 16. Advantageously, by not rewriting the count of the access code after repeated failed attempts on the same access control 16 a hotel guest will not be locked out of their room 208 if they tried the access control 16 of their room multiple times when the access control 16 on their room 208 is in a mode where they cannot access the room. For example, if two guests are sharing a room 208 and one is in the room 208 and has enabled the privacy bolt (a part of the lock actuator 22 in FIG. 2) the access control 16 may not allow a key card 92 to be granted access. In this example, if the guest attempts multiple times, the count is only rewritten once and not every time they attempt and fail. Advantageously, by rewriting the count of the access code after repeated failed attempts on different access controls 16, suspicious behavior may be identified and stopped. An example of suspicious behavior may be someone randomly inserting the key card 92 into the access controls 16 of various rooms 208, hoping to correctly guess right and gain access to one room 208. Once the access code of a key card 92 equals a desired value of failed access request attempts then a lock audit 310 will be transmitted to the server 14 to be reviewed by a technician. Once the access code of a key card 92 equals the selected desired value of failed access request attempts then the key card 92 that reached the desired value may be disabled automatically or a technician may disable the card through the server 14. The disabling of the key card 92 may also be that the access control 16 will not process any credential data when the desired value has been reached. Once the access code of a key card 92 equals a desired value of failed access request attempts then a notification 308 may be sent to the mobile device 12 associated with the key card 92. The notification 308 may inform the person that their key card has been disabled after reaching a desired value of failed access request attempts. In an embodiment, the desired value is three credential denials.

The communication capability between both the access control 16 and the mobile device 12 may dictate how the how the lock audit 310 and notifications 308 are received. The access control 16 may be wirelessly connected to the wireless access protocol device 212 and communicate wirelessly to the mobile device 12. In a non-limiting embodiment, even if the access control 16 is wirelessly capable, communication between the mobile device 12 and the access control 16 may occur through the server 14. For example, the access control 16 may communication wirelessly through the wireless access protocol device 212 to the server 14 and then the server 14 may relay the communication wirelessly to the mobile device 12. In a further example in the opposite direction, the mobile device 12 may communicate wirelessly to the server 14 and the server 14 may communicate wirelessly through the wireless access protocol device 212 to the access control 16. The communication between the server 14 and the mobile device 12 may occur through the wireless access protocol device 212 or another wireless network such as, for example, a cellular network. The access control 16 may be hardwired to the server 14 and thus communication between the mobile device 12 and the access control 16 may occur through the server 14. If the access control 16 is not hardwire connected to the server 14 or wirelessly connected to the server 14, the communication may occur between the access control 16 and the mobile device 12 via short range wireless communication, such as for example Wi-Fi, Bluetooth, zigbee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication.

The access control 16 may also be wired and/or wirelessly connect to the room management system 210. The access control 16 may be wirelessly connected to the room management system 210 through Wi-Fi, Bluetooth, zigbee, infrared or any other wireless connection known to one of skill in the art. The access control 16 may transmit the lock audit 310 and notification 308 to the room management system 210 and the lock audit 310 may be viewed on a display screen 210a of the room management system 210. In the event a person assigned to the room 208 does not have a mobile device 12, the person may view lock audits 310 and notification 308 through the room management system 210.

Figure 2:
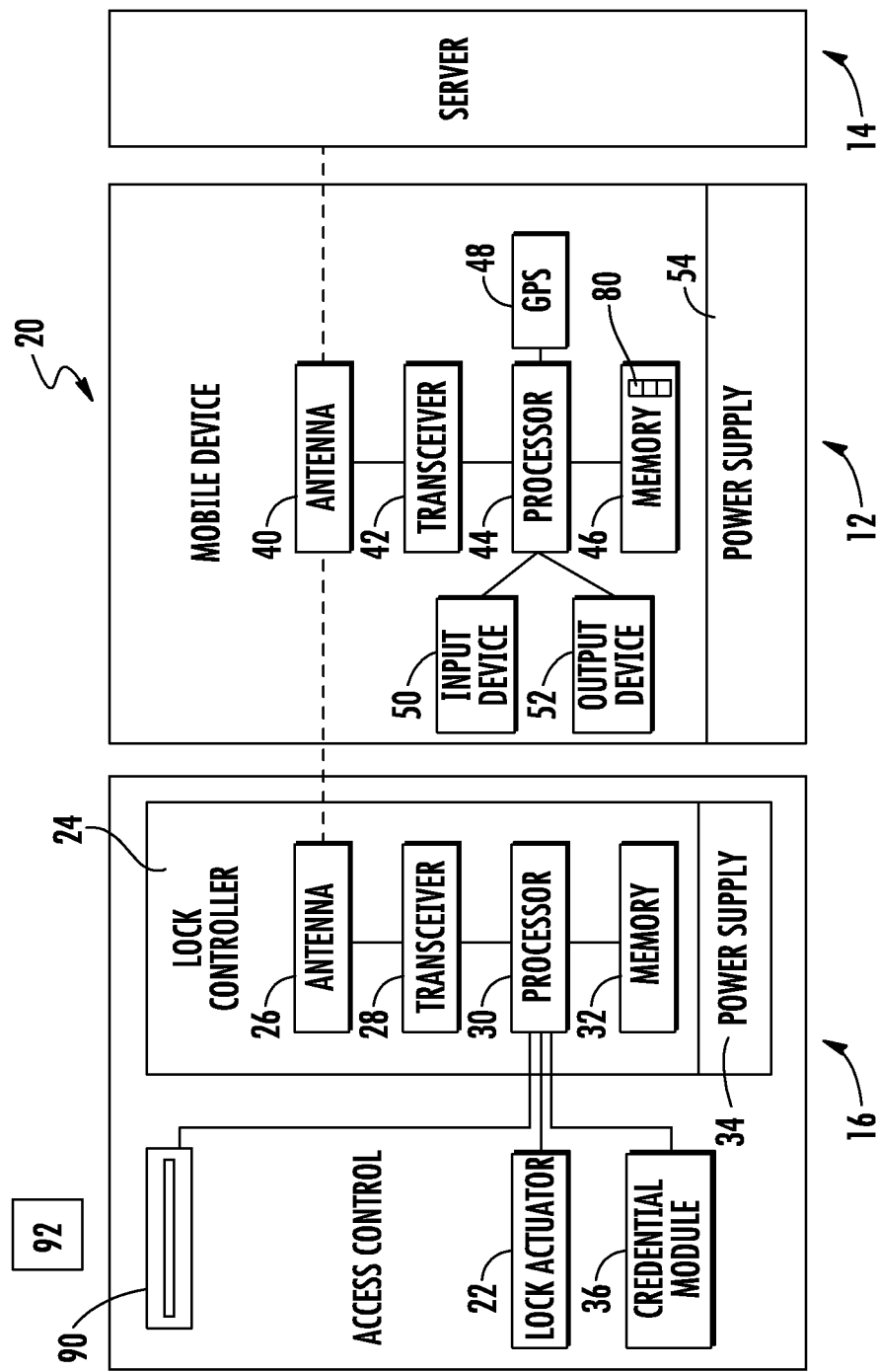
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90 and a credential module 36. The access control 16 may have essentially two readers, one reader 90 to read a physical key card 92 and the credential module 36 to communicate with the mobile device 12 via the lock processor 30 and the transceiver 28 and antenna 26. The access control 16 is responsive to credentials from the mobile device 12, and may, for example, be the lock of a door lock on a hotel room. In an embodiment, the mobile device 12 may act as the key card 92 to unlock the access control 16. Although the present disclosure focuses primarily on credentials for access control, it should be appreciated that other systems wherein credentials are transmitted from a key card 92 of mobile device 12 to an access control 16 so as to identify the user to an online system or validate user access rights or permissions in an offline system will benefit herefrom. Such systems include hotel door lock systems. Upon receiving and authenticating an appropriate credential from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, zigbee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock memory 32 may store a policy the controls the count of the access code and stores the desired value. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options and the lock audit 310. The lock audit 310 may be a unified audit trail that includes events initiated by accessing the lock via the key card 92. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In an embodiment, the mobile device 12 may act as the key card 92 to unlock the access control 16 and the count of the access code may be established/rewritten on the mobile device 12. The mobile device 12 may also include a mobile device application 80. Embodiments disclosed herein, may operate through the mobile device application 80 installed on the mobile device 12.

Figure 3:
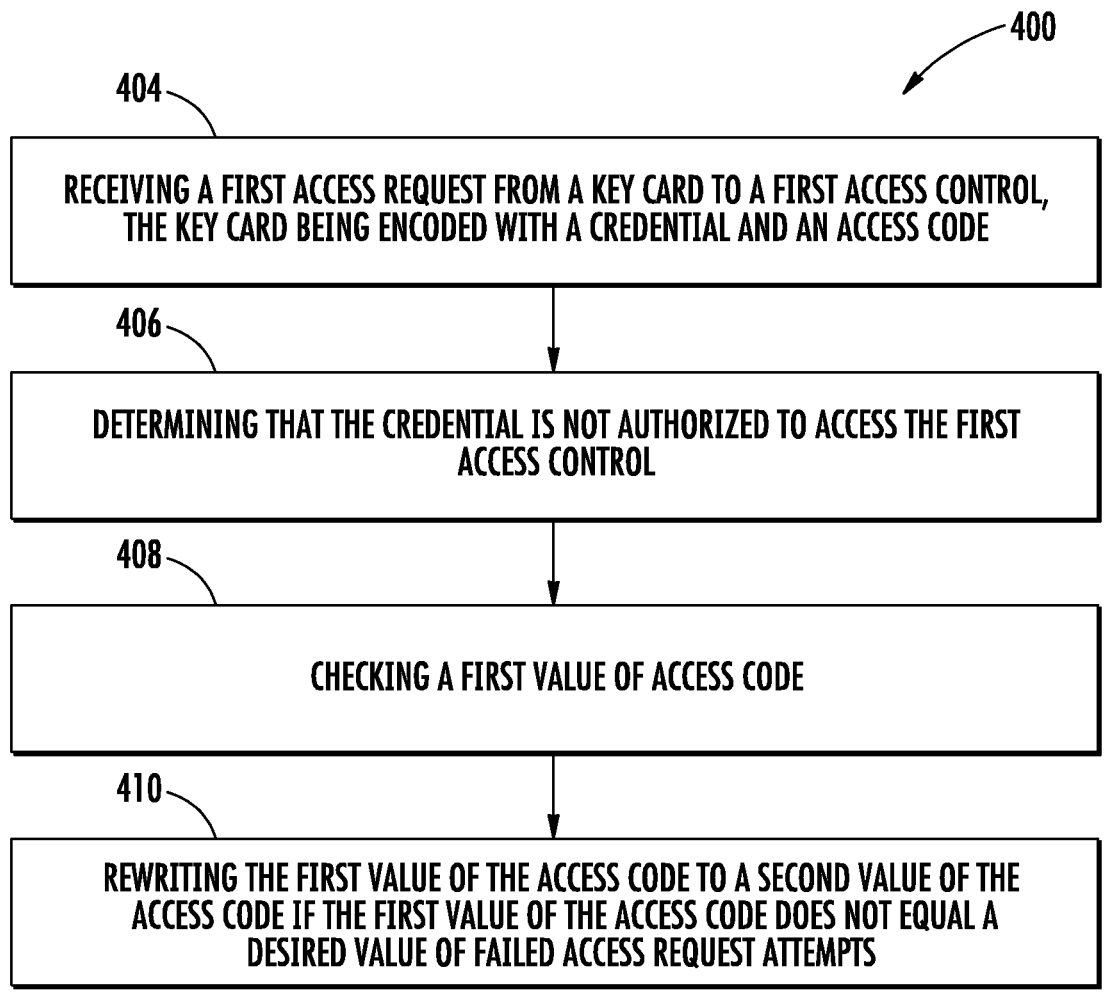
FIG. 3 is a flow diagram illustrating a method of monitoring access requests to one or more access controls of an access control system, according to an embodiment of the present disclosure.

Referring now to FIG. 3 with continued reference to FIGS. 1-2. FIG. 3 shows a flow chart of a method 400 of monitoring access requests 304 to one or more access controls 16 of an access control system 10, in accordance with an embodiment of the disclosure. At block 404, the first access control 16 receives a first access request 304 from a key card 92. As mentioned above, the key card 92 is encoded with a credential and an access code. At block 406, the first access control 16 determines 16 that the credential is not authorized to access the first access control 16 and denies the key card 92 access to the first access control 16. At block 408, the first access control 16 checks a first value of the access code. At block 410, the first access control 16 rewrites the first value of the access code to a second value of the access code if the first value of the access code does not equal a desired value of failed access request attempts. In an embodiment, the access code is only rewritten if the credential was not denied on the first access control 16 prior to the first access request 304.

The first access control 16 may disable the credential when the access code reaches the desired value of failed access request attempts. The first access control 16 may refuse to read the key card 92 if the count is equal to the desired value. Alternatively the access control 16 may erase the key card 92 or modify the credential so it is no longer operable with any access control 16. The method 400 may further include transmitting a notification 308 to a mobile device 12 associated with the key card 92 when the credential is disabled. The method 400 may also include transmitting a notification to a server 14 when the credential is disabled. Once the access code is rewritten, the first access control 16 may re-check the count of the access code to check whether the count of the access code now equals the desired value of failed access request attempts. If the count of the access code now equals the desired value of failed access request attempts then the first access control 16 disables the credential of the card 92.

In embodiment the desired value is equal to three failed access request attempts. In an example, numerical values may be used to maintain the count of the access code. For instance, after getting the access code rewritten from "0" to "1" at the first access control 16, if the key card 92 is placed in a second access control 16 different from the first access control 16 and the credential is not authorized to access the second access control 16 then the access code is rewritten from "1" to "2" by the second access control 16. Then, if the key card 92 is placed in a third access control 16 different from the first access control 16 and the second access control 16, and the credential is not authorized to access the third access control 16 then the access code is rewritten from "2" to "3" by the third access control 16. Once the access code is equal to a desired value of "3" then the credential of the key card 92 may be disabled. Thus, if the key card 92 is entered into a further access control 16 then the key card 92 will be denied access to the fourth access control 16. If the access code is not at "0" but also not at a desired value and then a person uses the key card 92 in the correct access control 16, the access code may be rewritten back to "0". For example, a person may have used the key card 92 to try to access two hotel rooms and failed both times, which brings the access code to "2". But then the person correctly uses the key card 92 to access their hotel room and the access control 16 on their hotel room may rewrite the access code back to "0".

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring access requests to one or more access controls of an access control system, the method comprising:
   receiving a first access request from a key card to a first access control, the key card being encoded with a credential and an access code, wherein the access code maintains a count of a number of times that the credential has been denied by the first access control or any other access control;
   determining that the credential is not authorized to access the first access control;
   checking a first value of the access code, wherein the first value represents the count prior to the first access request; and
   rewriting the first value of the access code to a second value of the access code if the first value of the access code does not equal a desired value of failed access request attempts, wherein the second value represents the count after the first access request; and
   disabling the credential when the access code reaches the desired value of failed access request attempts,
   wherein the count of the access code is configured to only be rewritten once if multiple access requests are received from the key card to an access control and the credential of the key card is authorized to access the access control but the access control is in a mode where the access control does not allow the key card to be granted access.

2. The method of claim 1, wherein:
   the first value of the access code is only re-written to the second value of the access code if the credential was not denied on the access control prior to the first access request.

3. The method of claim 1, further comprising: transmitting a notification to a mobile device associated with the key card when the credential is disabled.

4. The method of claim 1, further comprising: transmitting a notification to a server when the credential is disabled.

5. The method of claim 1, wherein:
   the desired value is equal to three failed access request attempts.

6. The method of claim 1, further comprising:
   checking the second value of the access code;
   determining that the second value of the access code equals the desired value of failed access request attempts; and
   disabling the credential when the second value of the access code is equal to the desired value of failed access request attempts.

7. The method of claim 1, further comprising:
denying the key card access to the first access control.

8. The method of claim 1, further comprising:
receiving a second access request from the key card to a second access control;
determining that the credential is not authorized to access the second access control;
checking the second value of the access code; and
rewriting the second value of the access code to a third value of the access code if the second value of the access code does not equal the desired value of failed access request attempts, wherein the third value represents the count after the second access request.

9. The method of claim 8, further comprising:
receiving a third access request from the key card to a third access control;
determining that the credential is not authorized to access the third access control;
checking the third value of the access code;
rewriting the third value of the access code to a fourth value of the access code if the third value of the access code does not equal the desired value of failed access request attempts, wherein the fourth value represents the count after the third access request;
checking the fourth value of the access code;
determining that the fourth value of the access code equals the desired value of failed access request attempts; and
disabling the credential when the fourth value of the access code is equal to the desired value of failed access request attempts.

10. The method of claim 9, further comprising:
receiving a fourth access request from the key card to a fourth access control;
determining that the credential is not authorized to access the fourth access control; and
denying the key card access to the fourth access control.

11. The method of claim 1, whereinthe credential is disabled when the access code reaches the desired value of failed access request attempts in response to a policy stored in an access control.

12. A first access control configured to control access to a room, the access control comprising:
a processor; and
a memory comprising computer-executable instructions that, when executed by the processor, cause the processor to perform operations, the operations comprising:
receiving a first access request from a key card to the first access control, the key card being encoded with a credential and an access code, wherein the access code maintains a count of a number of times that the credential has been denied by the first access control or any other access control;
determining that the credential is not authorized to access the first access control;
checking the first value of the access code, wherein the first value represents the count prior to the first access request;
rewriting the first value of the access code to a second value of the access code if the first value of the access code does not equal a desired value of failed access request attempts, wherein the second value represents the count after the first access request; and
disabling the credential when the access code reaches the desired value of failed access request attempts,
wherein the count of the access code is configured to only be rewritten once if multiple access requests are received from the key card to an access control and the credential of the key card is authorized to access the access control but the access control is in a mode where the access control does not allow the key card to be granted access.

13. The first access control of claim 12, wherein:
the access code is only increased if the credential was not denied on the first access control prior to the first access request.

14. The first access control of claim 12, wherein the operations further comprise: transmitting a notification to a mobile device associated with the key card when the credential is disabled.

15. The first access control of claim 12, wherein the operations further comprise:
transmitting a notification to a server when the credential is disabled.

16. The first access control of claim 12, wherein:
the desired value is equal to three failed access request attempts.

17. The first access control of claim 12, wherein the operations further comprise:
checking the second value of the access code;
determining that the second value of the access code equals the desired value of failed access request attempts; and
disabling the credential when the second value of access code is equal to the desired value of failed access request attempts.

18. The first access control of claim 12, wherein the operations further comprise:
denying the key card access to the first access control.

19. A computer program product tangibly embodied on a non-transitory computer readable medium, the computer program product including instructions that, when executed by a processor, cause the processor to perform operations comprising:
receiving a first access request from a key card to a first access control, the key card being encoded with a credential and an access code, wherein the access code maintains a count of a number of times that the credential has been denied by the first access control or any other access control;
determining that the credential is not authorized to access the first access control;
checking a first value of the access code, wherein the first value represents the count prior to the first access request; and
rewriting the first value of the access code to a second value of the access code if the first value of the access code does not equal a desired value of failed access request attempts, wherein the second value represents the count after the first access request; and
disabling the credential when the access code reaches the desired value of failed access request attempts,
wherein the count of the access code is configured to only be rewritten once if multiple access requests are received from the key card to an access control and the credential of the key card is authorized to access the access control but the access control is in a mode where the access control does not allow the key card to be granted access.

* * * * *